United States Patent [19]

Peikert

[11] Patent Number: 4,467,600
[45] Date of Patent: Aug. 28, 1984

[54] SYSTEM FOR CONTROLLING THE THRUST NOZZLE ADJUSTMENT OF DUAL CYCLE GAS TURBINE JET PROPULSION ENGINES

[75] Inventor: Jürgen Peikert, Munich, Fed. Rep. of Germany

[73] Assignee: Messerschmitt-Boelkow-Blohm GmbH, Munich, Fed. Rep. of Germany

[21] Appl. No.: 496,336

[22] Filed: May 23, 1983

Related U.S. Application Data

[63] Continuation of Ser. No. 171,258, Jul. 22, 1980.

[30] Foreign Application Priority Data

Jul. 31, 1979 [DE] Fed. Rep. of Germany ....... 2930956

[51] Int. Cl.³ .............................................. F02K 1/18
[52] U.S. Cl. ........................................ 60/204; 60/242
[58] Field of Search ................ 60/204, 236, 237, 238, 60/239, 242, 262

[56] References Cited

U.S. PATENT DOCUMENTS

| | | | |
|---|---|---|---|
| 3,401,524 | 9/1968 | Urban | 60/242 |
| 3,854,287 | 12/1974 | Rembold | 60/242 |
| 4,139,887 | 2/1979 | Levesque | 60/242 |
| 4,159,625 | 7/1979 | Kerr | 60/242 |

FOREIGN PATENT DOCUMENTS

| | | | |
|---|---|---|---|
| 1382214 | 11/1964 | France | 60/242 |
| 5540214 | 3/1980 | Japan | 60/242 |
| 2054745 | 2/1981 | United Kingdom | 60/242 |

Primary Examiner—Lous J. Casaregola
Attorney, Agent, or Firm—W. G. Fasse; D. F. Gould

[57] ABSTRACT

The thrust nozzle opening angle of two cycle gas turbine jet engines is controlled in a system which comprises a low pressure compressor driven by a low pressure turbine. A first compressor is arranged radially inward for a first flow cycle or circuit and a second compressor is arranged radially outward for a second flow cycle or circuit. A high pressure compressor is driven by a high pressure turbine. A combustion chamber is situated upstream of the high pressure turbine. An afterburner is supplied with the turbine gases from the first, hot flow cycle and with compressed air from the second, relatively cool flow cycle or circuit. The system may have multiple shafts. The control is effected with reference to the instantaneous pressure relationship ($\pi$NVZ) between the static pressure ($p_{sD}$) downstream of the radially outer compressor (1a) of the second flow cycle (k2) and the static pressure ($p_{sE}$) of the air flowing into the propulsion system. This ratio constitutes a variable rated control value ($\pi_{NVZ\text{-}Soll}$) and is calculated as a function of the reduced rpm ($N_r$) of the low pressure compressor (1). This type of control guarantees during a steady state operation particularly a minimal fuel consumption in the subsonic region and a maximum thrust in the supersonic region. This type of control further assures during a nonsteady type of operating, particularly the stability between the two aerodynamic limits, compressor surges ($G1_B$ or $G1_H$) on the one hand and afterburner quenching ($G2_B$ or $G2_H$) on the other hand.

3 Claims, 4 Drawing Figures

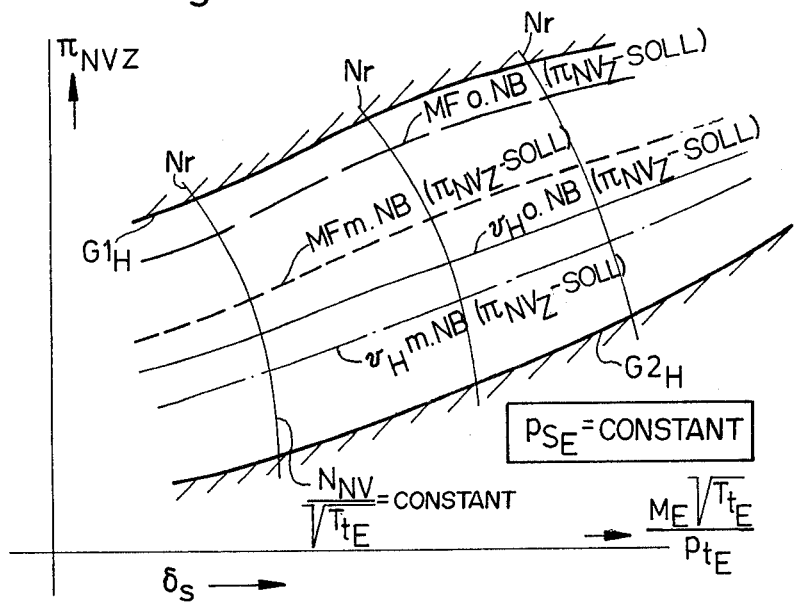
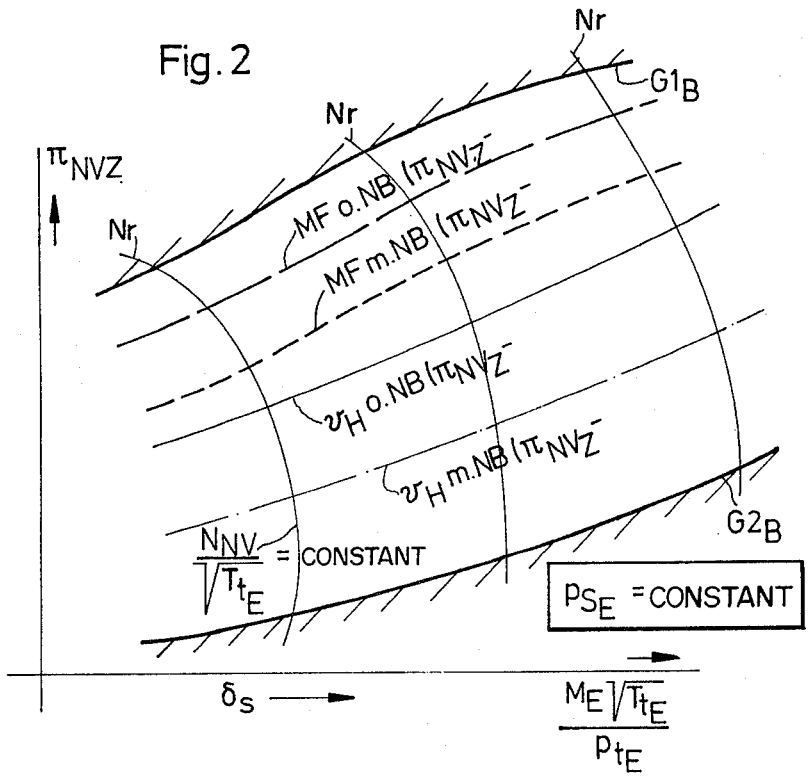

SYSTEM FOR CONTROLLING THE THRUST NOZZLE ADJUSTMENT OF DUAL CYCLE GAS TURBINE JET PROPULSION ENGINES

This is a continuation of application Ser. No. 171,258, filed July 22, 1980.

BACKGROUND OF THE INVENTION

The invention relates to a system for controlling the thrust nozzle adjustment of two cycle gas turbine jet propulsion engines. More specifically, the invention relates to a method and to an apparatus for said adjustment, whereby the opening angle of the thrust nozzle is adapted to the instantaneous operating condition of the jet engine.

A system in which the present invention may be practiced comprises a low pressure compressor driven by a low pressure turbine and a radially inwardly situated compressor for the first flow cycle or circuit and a radially outwardly situated compressor for the second flow cycle or circuit. The system also comprises a high pressure compressor, which is driven by a high pressure turbine. A combustion chamber is located upstream of the high pressure turbine. An afterburner is supplied with the turbine gases from the first, hot flow cycle and with compressed air from the second, relatively cold flow cycle. The system is equipped with multiple shafts.

Adjustable thrust nozzles for varying the effective exit surface for the thrust jet are primarily used in gas turbine jet propulsion plants with afterburning, because this operating condition requires an increased flow rate or throughput and higher gas temperatures. The adjusting of the thrust nozzles is accomplished by an open loop or closed loop control as a function of various parameters, in particular as a function of the turbine pressure gradient or differential, which represents a proportional measure for the instantaneous power of the engine.

The known types of closed and open loop controls for the thrust nozzle adjustment do not take into account the full scope of the aerodynamic and thermodynamic complexity of a gas turbine jet propulsion plant.

Special problems occur in connection with engines of this type having the highest specific power, having regard to the fastest load changes, particularly in aerial combat calling for high velocity changes and large flight altitude differences. These problems must be solved with a high safety factor. In addition, a small specific fuel consumption is required substantially for flight conditions, especially during cruise flight.

The axial compressor substantially always used in high power propulsion plants has great advantages, but it only has a relatively narrow stable operating range. In addition, the tuning of the gas turbine with an axial compressor still causes great difficulties even today. An engine construction is required, which allows an operating of the gas turbine over a very large load range without compressor pumping or surging. Due to this phenomenon, the air flow between the individual compressor stages separates or is interrupted, which may lead to a considerable power reduction of the engine even to the extent of a complete collapse of the flow process. Several measures have been developed in order to avoid the feared compressor surging or pumping. First, it is possible to adjust or increase the effective cross section of the air intake in the supercritical operating condition. Secondly, the effective opening cross section of the thrust nozzle may be varied in order to avoid a detrimental reverse or feedback effect on the aerodynamically sensitive axial compressor or compressors. In addition it is possible especially under partial load operation, to adjust the guide blades of the compressor and/or to blow off some of the compressed air between the individual compressor stages, which however, causes a reduction in power. The dividing of the axial compressor of multiple shaft engines of the type mentioned above into several compressor groups, which operate with different rpms also serves particularly to prevent the compressor surging or pumping and to further extend the surging limit.

The operating performance characteristics of a gas turbine jet engine or propulsion plant with afterburning on the other hand, is determined by the quenching limit of the afterburner. The afterburner is blown out by too large flow mach numbers, at which a stable combustion may no longer occur. Hence, the exceeding of this limit is also to be avoided.

OBJECTS OF THE INVENTION

In view of the foregoing it is the aim of the invention to achieve the following objects singly or in combination:

to produce optimum working conditions with reference to maximum efficiency and operational safety for a gas turbine jet engine over its entire operating range not only under the conditions of cruise flight but also in instances of high flight accelerations or in instances of large load changes, such as might occur during aerial combat;

to control the opening angle of the thrust nozzle in closed loop fashion by a control value which is the result of comparing a rated operation representing value, with an actual, presently measured operating value; and to assure minimal fuel consumption during subsonic stationary operation and maximum thrust during supersonic stationary operation, and to assure stable operating conditions over a wide operational range.

SUMMARY OF THE INVENTION

According to the invention, the control value, especially for a closed loop control system, is formed by calculating the pressure ratio as an instantaneous pressure relationship ($\pi_{NVZ}$) between the pressure ($p_{sD}$) downstream of the radially outward compressor of the second flow cycle and the pressure ($p_{sE}$) of the air flowing into the propulsion system is utilized. This control value constitutes a variable rated value ($\pi_{NVZ\text{-}Soll}$) which is plotted as a function of the reduced rpm ($N_r$) of the low pressure compressor (1a). Such a control value guarantees during steady operation, particularly a minimal fuel consumption in the subsonic range of operation and a maximum thrust in the supersonic range of operation. Such control value further assures during non-steady operation, particularly the stability between the two aerodynamic limits, compressor surges ($G1_B$ or $G1_H$) on the one hand and afterburner quenching ($G2_B$ or $G2_H$) on the other hand.

The control variable desired ($\pi_{NVZ\text{-}Soll}$) according to the invention forms rated control curves in the control characteristic field for the steady operating conditions cruise flight without afterburning (MFo·NB), for the cruise flight with afterburning (MFm·NB), and for the nonsteady operating conditions with and without afterburning ($v_Hm$·NB and $v_Ho$·NB). The ordinate of the control characteristic field is determined by the pressure ratio $p_{sD}/p_{sE}$ and the abscissa is determined by the reduced rpm ($N_r$) of the low pressure compressor. The values of said rated control curves are predetermined either computationally and/or by means of wind tunnel tests, or bench tests and/or flight tests and stored in the control means. If a control deviation occurs it is determined by a comparison of the respective rated value represented as a point on the appropriate rated control curve ($\pi_{NVZ\text{-}Soll}$) with the instantaneous actual or measured value ($\pi_{NVZ\text{-}Ist}$). Any deviation so determined and brought to zero by changing the opening angle ($\delta_S$) of the thrust nozzles or by changing the effective thrust nozzle cross section.

In an embodiment of the invention the rated control curves ($\pi_{NVZ\text{-}Soll}$) of all of the above mentioned operating conditions plotted in the control characteristic field or stored in the control means are defined as functions of the flight altitude or as functions of a value proportional to this variable, namely the static pressure ($p_{sE}$) of the air flowing into the propulsion system. If a control deviation occurs, then a control movement is made toward the respective rated control curve ($\pi_{NVS\text{-}Soll}$) in accordance with the instantaneously measured pressure ($p_{sE}$) and in accordance with the instantaneous operating condition (MFo·NB, MFm·NB, $v_{Ho}$·NB, $v_{Hm}$·NB).

As has been mentioned above, the object of prior art closed loop and open loop controls of adjustable thrust nozzles, is to make sure during operation, that the operating point is within the two stated aerodynamic limits at any instance in order to avoid compressor surges and quenching of the afterburner chamber. The purpose of these prior art efforts is to achieve optimal operating conditions. However, the parameters used heretofore for closed or open loop control are not suited to attain this optimum, because the devices and probes provided in engines installed in aircraft for measuring these parameters are not able, quantitatively or qualitatively to determine with a sufficient accuracy the actually occurring instantaneous values of the respective flight conditions, particularly with reference to extreme situations such as high angles of attack of the aircraft and large negative and positive accelerations. Thus, the actual control variable, that is, the engine rate of throughput during flight is practically not measurable and must, as a result, be eliminated as a direct control variable during flight.

The invention has solved this problem by precalculating the possible throughput rate values with an approximation or sufficiently accurately. These precalculations are based on bench tests and flight tests, which may involve substantial efforts in the data gathering. However, starting with these values in the form of stored data, has the advantage that extensive measuring during flight is obviated, because the precalculated values are used in place of the practically occuring optimal engine throughput flow rate, that is, the variable precalculated values are functionally related to the corresponding thrust nozzle adjustment angles, and these thrust nozzle adjustment angles are set according to the proposed control function. A particular advantage of the invention is seen in that the actual or measured values of the control variable may be measured in a simple manner during practical flight operation. This also applies to the determination or the selection of the appropriate rated control curve due to the possibility of an exact yet simple measurement of the pressure upstream of the compressor of the outer flow cycle of the rpm ($N_{NV}$) of the low pressure compressor, of the power lever positions, of the power lever speeds, of the temperature of the air flowing into the engine, and due to an exact determination of the actual value of the thrust nozzle opening angle, from which the rated values of the measured variable may be determined.

According to the invention it is possible, by controlling of the thrust nozzle, to keep the operating point of the low pressure compressor of the second flow cycle at optimal values, which have been predetermined in tests with a sufficient exactness. The various operating conditions such as partial loads, full load, with and without afterburning, subsonic and supersonic flight, load changing speeds, etc. may be taken into account during these tests. The results of these tests are the rated control curves ($\pi_{NVZ\text{-}Soll}$), which are stored in a memory of the control circuit means as a measurement code for the different above mentioned operating conditions.

According to the invention, thus the value $\pi_{NVZ\text{-}Soll}$ forms the measurable variable or control variable proportional to the rated value of the optimal thrust nozzle opening $\delta_S$ and takes the place of the latter as a measurement for the optimal engine throughput rate and for the optimal operating point of the low pressure compressor of the second flow cycle, which is influenced by the special aerodynamic effect of the thrust nozzle operation and of the afterburner operation. The value $\pi_{NVZ\text{-}Soll}$ reacts sensitively to this effect. There is no ideal solution to these complex problems, because such a solution would require keeping the control in all operating situations very close along the surge limit, since the efficiency of the compressor is highest here. Consequently, the invention particularly differentiates from the prior art in that during the cruise flight phases primary importance is placed on minimal specific fuel consumption; by controlling relatively close to the surge limit, especially in the subsonic range without afterburning. On the other hand, the highest possible thrust is aimed at, for the transonic and supersonic flight range normally with afterburning. Furthermore, the invention allows for the critical phases in the range of substantially reduced rpms occurring during large load changes or in connection with extreme power stage changes by the pilot during aerial combat. These critical phases are taken into account by a sufficient spacing of the rated control curves ($\pi_{NVZ\text{-}Soll}$) two from the aerodynamic limits, since the thrust reserve is still large in the instance of relatively small flight velocities. On the other hand, more importance is placed on maximum thrust than is placed on safe control of fast load changes in the instance of high transonic and supersonic flight velocities, wherein the afterburner is usually switched on and the difference between the thrust and the aircraft drag is small.

The invention suggests a control system which is determined by and geared to the practical flight operation. This control system optimally takes into account and influences the important performance characteristics of the engine.

BRIEF FIGURE DESCRIPTION

In order that the invention may be clearly understood, it will now be described, by way of example, with reference to the accompanying drawings, wherein:

FIG. 2 shows a graph for the second flow cycle of the low pressure compressor near the ground;

FIG. 3 shows a graph for the second flow cycle of the low pressure compressor at greater altitude.

LIST OF SYMBOLS USED IN THIS DISCLOSURE:

| | | |
|---|---|---|
| (1) | $p_{sE} =$ | static pressure of the precompressed air supplied into the engine; |
| (2) | $T_{tE} =$ | absolute temperature of the precompressed air supplied into the engine; |
| (3) | $p_{sD} =$ | static pressure at output of compressor 1b; |
| (4) | $N_{NV} =$ | mechanical rpm of low pressure compressor 1; |
| (5) | $\delta_{S\text{-}Soll} =$ | rated or desired thrust nozzle opening angle; |
| | $\delta_{S\text{-}Ist} =$ | actual thrust nozzle opening angle; |
| | $X_{S\text{-}Ist} =$ | value proportional to actual thrust nozzle opening; |
| (6) | $X_{S\text{-}Soll} =$ | value proportional to rated thrust nozzle opening; |
| (7) | $H =$ | power lever; |
| (8) | $G1_B =$ | compressor pumping or surging limit near the ground; |
| (9) | $G1_H =$ | compressor pumping or surging limit at relatively high altitude; |
| (10) | $G2_B =$ | after burner blow-off or quenching limit near the ground; |
| (11) | $G2_H =$ | after burner blow-off or quenching limit at high altitude; |
| (12) | $\pi_{NVZ\text{-}Ist} =$ | actual instantaneous pressure ratio; |
| | $\pi_{NVZ\text{-}Soll} =$ | instantaneous pressure ratio (rated or desired); |
| (13) | MF o. NB = | closed loop rated control characteristic for steady state cruise flight without afterburning; |
| (14) | MF m. NB = | closed loop rated control characteristic for steady state cruise flight with afterburning; |
| (15) | $v_H$-o.NB = | rated closed loop control characteristic non-stationary operation without afterburning; |
| (16) | $v_H$-m.NB = | rated closed loop speed control characteristic non-stationary operation with afterburning; |
| (17) | $Nr =$ | reduced rpm |
| (18) | $\dfrac{M_E \sqrt{T_{tE}}}{p_{tE}} =$ | corrected air flow |
| (19) | $p_{tE} =$ | total pressure of the precompressed air supplied into the engine |
| (20) | $M_E =$ | air mass flow per second into the engine |
| (21) | $\dfrac{p_{sD}}{p_{sE}} =$ | $\pi_{NVZ\text{-}Ist}$ = measured or actual pressure ratio $\pi_{NVZ\text{-}Soll}$ = calculated or rated pressure ratio |
| (22) | $H_U =$ | switch over point of power lever H |
| (23) | $\dfrac{ds}{dt} = v_H =$ | rate of change of power lever H |
| (24) | $\epsilon\pi =$ | error signal between rated and actual value |
| (25) | $\Delta X_S =$ | $X_{S\text{-}Soll} - X_{S\text{-}Ist}$ = nozzle control signal |
| (26) | mm = | millimeter |
| (27) | $K_1 =$ | first flow engine circuit |
| (28) | $K_2 =$ | second flow engine circuit |

DETAILED DESCRIPTION OF PREFERED EXAMPLE EMBODIMENTS AND OF THE BEST MODE OF THE INVENTION

Figure 1:
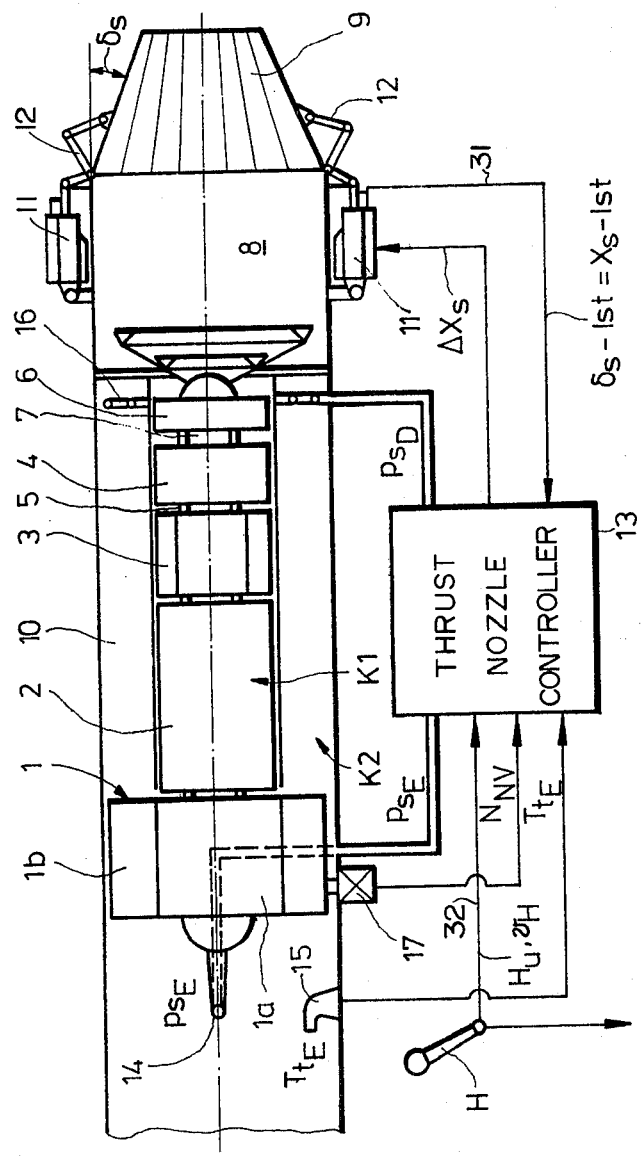
FIG. 1 shows schematically a two cycle gas turbine jet engine with a control arrangement.

FIG. 1 shows a system wherein a two cycle gas turbine jet engine comprises essentially a two cycle or circuit low pressure compressor 1 with a radially inner compressor 1a and a radially outer compressor 1b. A high pressure compressor 2 is supplied with compressed air by the radially inner compressor 1a and discharges into a combustion chamber 3. Fuel is injected into the chamber 3 for producing propellant gas. A high pressure turbine 4 is operatively arranged downstream of the combustion chamber 3. The high pressure turbine 4 drives the high pressure compressor by means of a hollow shaft 5. A low pressure turbine 6 drives the low pressure compressor 1 by means of a central shaft 7. A further portion of the fuel is injected into an afterburner chamber 8 during an afterburning operation for a special power increase of the engine or power plant. A thrust nozzle 9 having an adjustable opening cross section is operatively connected to the output of the afterburner. The devices 1, 2, 3, 4 and 6 form the first engine flow cycle or circuit also referred to as the "hot" flow cycle K1. The compressor 1b with its flow channel 10 forms the second engine flow cycle or circuit also referred to as the "cold" flow cycle K2. The flow channel 10 also discharges into the afterburner chamber 8. The opening angle $\delta_S$ of the nozzle 9 is variable by means of adjusting cylinder piston units operatively connected to the thrust nozzle 9 through rod linkage means 12.

Figure 4:
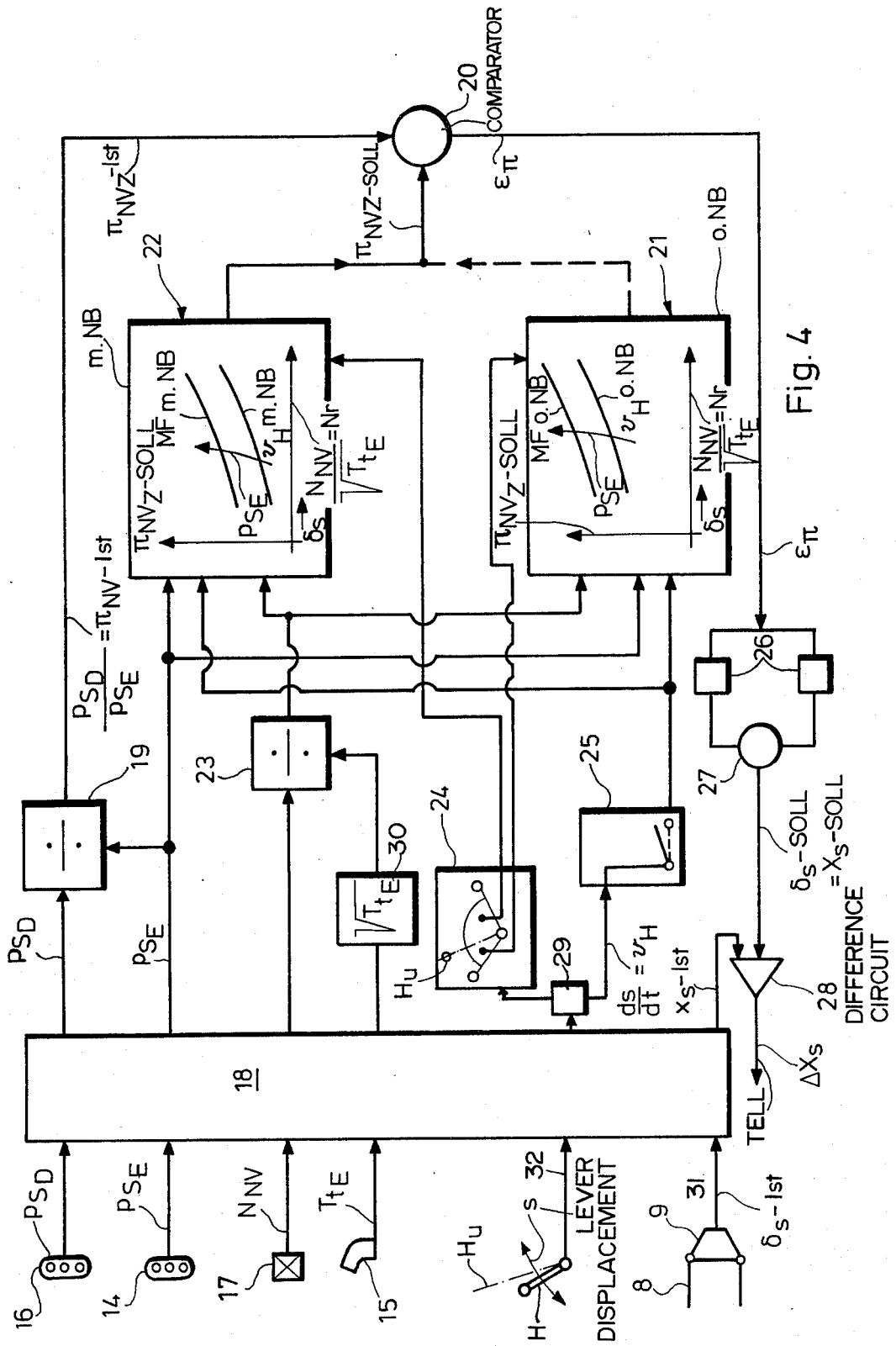
FIG. 4 shows a connection diagram of the control arrangement.

The following physical variables are supplied into the thrust nozzle controller 13, the details of which are shown in FIG. 4. The static pressue $p_{sE}$ of the air flowing into the engine is measured by means of a pressure sensor 14. This inflowing air has already been precompressed by the subsonic-supersonic intake. The absolute temperature $T_{tE}$ of the incoming air is measured by means of a temperature sensor 15. The pressure $p_{sD}$ downstream of the compressor 1b is measured by means of a pressure sensor 16. The mechanical rpm $N_{NV}$ of the low pressure compressor 1 is measured by an rpm counter or meter 17. The actual setting of the thrust nozzle 9 or the thrust nozzle opening angle $\delta_S$ or the value $X_{S\text{-}Ist}$ proportional to this angle is conventionally measured and supplied through analog-to-digital converter 18 connected, for example, to a displacement transducer responsive to the piston rod movement. The engine power and time rate of change of the engine power called for by the aircraft pilot is determined by the position of the power lever or fuel lever H and the movement velocity of said power lever or fuel lever H. The position and position change of the lever H are also conventionally sensed by a respective transducer and the correspondinding electrical signal is supplied through the analog-to-digital converter 18 to the respective input of the controller.

FIGS. 2 and 3 show graphs for the compressor 1a each including two aerodynamic limits. The upper limits are shown at $G1_B$ or $G1_H$. The meaning of these abbreviations is shown in the above list. The lower limits are shown at $G2_B$ and $G2_H$. By comparing FIG. 2 with FIG. 3 it may be seen from the graphs that the aerodynamic limits $G1_H$ and $G2_H$ lie closer together at high altitudes (FIG. 3), than for flights near the ground (FIG. 2), so that the situation at high altitudes regarding to limit exceeding during the different operating conditions, is even more critical than in flight operations near the ground.

Four rated control curves $\pi_{NVZ\text{-}Soll}$ have been plotted in each graph. The first rated control curve MFo·NB is for cruise flight without afterburning. This curve (MFo·NB) shows that control movements here may be made relatively quite close to the compressor surging limit G1$_B$ or G1$_H$. As a result, the engine may be operated with good specific fuel consumption, which, as is well known, reaches a minimum in the vicinity of the compressor surging limit. This fact also applies in principle to cruise flight with afterburning. Accordingly, the rated control curve MFm·NB is also located in the upper region of the control characteristic field. The rated control curves V$_H$o·NB and V$_H$m·NB progress at a greater distance from the compressor surging limit G1$_B$ or G1$_H$, because the danger of exceeding the compressor surging limit G1$_B$ or G1$_H$ grows increasingly in the instance of larger rates of change of the power lever H, especially during aerial combat. This danger is highest in an operation with afterburning (V$_H$m·NB).

The curves N$_r$ for the reduced rpm of the low pressure compressor 1 have also been plotted in the graphs of FIGS. 2 and 3. Each of these curves represent a constant rpm which is proportional to the corresponding air flow rate $$\frac{M_E \sqrt{T_{iE}}}{p_{iE}}.$$

FIG. 4 shows the details of the closed loop control circuit 13 of FIG. 1. The physical variables mentioned above are supplied into an analog to digital converter arrangement 18. The digital value corresponding to the value p$_{sD}$ is supplied along with the digital value corresponding to p$_{sE}$ into a ratio computer 19. The pressure ratio value p$_{sD}$/p$_{sE}$=$\pi_{NVZ\text{-}Ist}$ is the instantaneous actual or measured value of the control variable computer 19. The output of the ratio computer 19 is the value $\pi_{NVZ\text{-}Ist}$ which is supplied to a comparator 20. The pressure p$_{sE}$ on the other hand is transmitted to rated control function computers 21 and 22. The control circuit comprises a certain number of such rated control function computers 21,22. The rated control function computers are divided into two categories. The computer 21 which operates without taking afterburning into account and the computer 22 which takes afterburning into account. A ratio computer 23 determines the reduced rpm N$_r$ from the two variables, namely the mechanical rpm N$_{NV}$ of the low pressure compressor 1 and the square root of the absolute temperature T$_{iE}$ of the air flowing into the engine. The square root computer is shown at 30. This reduced rpm N$_r$ forms the abscissa values in each function computer 21 and 22. A position discriminator 24 receives the lever speed signal v$_H$ from the A-D convertor 18 through a differentiator circuit 29 and determines the instantaneous position of the power lever H. The position discriminator 24 activates either the function computer 21 or the function computer 22 depending on whether it is to the left or to the right of the switch-over point H$_U$. The speed differentiator 29 also supplies the respective signal to a threshold circuit 25, which provides a speed or acceleration signal influenced by the movements of the power lever H. The threshold circuit, 25, as influenced by the movement of said power lever H, addresses the respective rated control function V$_H$o·NB or V$_H$m·NB in the respective function computer 21 or 22 when a certain value of the speed ds/dt is exceeded. If the above mentioned value ds/dt=V$_H$ lies below the prescribed speed value, then the rated control curves MFo·NB or MFm·NB are selected or addressed.

The p$_{sE\text{-}arrow}$ in the graphs of the function computers 21 and 22 symbolizes that there are many rated control functions stored in the memory of the controller 13, wherein each rated control curve is based on only one constant value p$_{sE}$.

After the rated control function computer 21 or 22, which is selected and addressed by the different actual or measured physical values, has determined the appropriate function value in response to a control deviation, that is, when it has determined the respective point $\pi_{NVZ\text{-}Soll}$ by using the instantaneous reduced rpm N$_r$ and the selected rated control function $\pi_{NV\text{-}Soll}$, the value corresponding to said point is passed along, as has been briefly described, to the comparator 20, which determines from $\pi_{NV\text{-}Soll}$ and from the actual value $\pi_{NVZ\text{-}Ist}$ the control deviation or rather the control signal $\epsilon\pi$. This control deviation $\epsilon\pi$ fed through the dynamic input portion 26 of the controller 13 to an angular value function computer 27, which calculates the functionally corresponding rated value X$_{S\text{-}Soll}$ for the thrust nozzle opening angle $\delta_S$. This rated angular value X$_{S\text{-}Soll}$ is fed to a difference value computer 28, which also receives the instantaneous actual angle $\delta_{S\text{-}Ist}$ of the thrust nozzle opening or X$_{S\text{-}Ist}$ respectively. The difference signal $\Delta$X$_S$ is thus determined from these two values, as a physical value corresponding to the number of mm for the piston rod movement or in volume units for the hydraulic liquid required for the adjusting of the cylinder 11. The calculated value is then fed to the adjusting cylinder 11 so that the control deviation $\Delta$X$_S$ may be brought to zero.

Although the invention has been described with reference to specific example embodiments, it is to be understood, that it is intended to cover all modifications and equivalents within the scope of the appended claims.

The functional means 18 to 29 are based for example on TTL - compatible Integrated Circuits (IC's) of 54/74 Families of the manufacturer Texas Instruments. Some typical data sheets are enclosed.

What is claimed is:

1. A method for controlling dual cycle gas turbine jet propulsion engines by means of pressure ratio closed loop control circuit which controls the adjustment of the opening angle of the thrust nozzle, comprising the following steps:

(a) measuring the actual static pressure (P$_{sD}$) downstream of the radial outer compressore (1a) of the second flow circuit (K2), (b) measuring the actual static pressure (P$_{sE}$) of the air flowing into the propulsion engine, (c) forming an actual pressure ratio between the actual pressures measured insteps (a) and (b) to provide an actual pressure ratio value ($\pi_{NVZ\text{-}IsT}$), (d) measuring the reduced revolutions per minute of the low pressure compressor (1) to provide a respective r.p.m. value (N$_r$), (e) storing in a first computor memory (21) rated pressure ratio values ($\pi_{NVZ\text{-}Soll}$) as a function of said reduced r.p.m. value (N$_r$) said rated pressure ratio values in said first computer memory taking into account as parameters steady state operating conditions without afterburning and acceleration state operating conditions without afterburning, (f) storing in a second computer memory (22) rated pressure ratio values ($\pi_{NVZ\text{-}Soll}$) as a function of said r.p.m. value (N$_r$), said rated pressure ratio values taking into account as parameters steady state operating conditions with afterburning and acceleration state operating conditions with afterburning, (g) providing to said computer memories a second signal for activating one or the other of the two memories depending on the on or off condition of an afterburner, (h) providing to said computer memories a first signal for activating one or the other of the two memories depending on the steady state operating condition parameter or the acceleration state operating condition parameter, and (i) comparing under the control of said first and second signals one of said stored rated pressure ratio functions with the actual pressure ratio value formed in step (c) from values measured insteps (a), (b) under corresponding operating conditions to determine a control deviation ($\epsilon\pi$), and controlling said thrust nozzle adjustment angle in response to said control deviation to return the control deviation substantially to a zero value under said operating conditions, whereby during steady state operation fuel consumption is minimized in the subsonic range while the thrust is maximized in the supersonic range, and whereby during the non-steady state of operation the stability between the two aerodynamic limits of the compressor surging on the one hand and of the afterburner chamber quenching on the other hand is assured.

2. The method of claim 1, further comprising providing an operating altitude representing signal, applying said operating altitude representing signal to said computer memories for preforming said comparing by taking said altitude representing signal into account.

3. The method of claim 2, wherein said operating altitude representing signal is proportional to said static pressure ($P_{sE}$) of the air flowing into the jet propulsion engine.

* * * * *

UNITED STATES PATENT AND TRADEMARK OFFICE
CERTIFICATE OF CORRECTION

PATENT NO. : 4,467,600
DATED : August 28, 1984
INVENTOR(S) : Juergen Peikert

It is certified that error appears in the above-identified patent and that said Letters Patent is hereby corrected as shown below:

Claim 1, line 2, before "pressure" insert --a--;

line 6, replace "($P_{SD}$)" by --($p_{SD}$)--;

line 7, replace "compressore" by --compressor--;

line 9, replace "($P_{SE}$)" by --($p_{SE}$)--;

line 12, replace "insteps" by --in steps--;

line 17, replace "computor" by --computer--;

line 43, (in step i), replace "insteps" by --in steps--.

Claim 3, line 3, replace "($P_{SE}$)" by --($p_{SE}$)--.

Signed and Sealed this

Eighth Day of January 1985

[SEAL]

Attest:

GERALD J. MOSSINGHOFF

*Attesting Officer*   *Commissioner of Patents and Trademarks*